(12) United States Patent
Gao et al.

(10) Patent No.: US 9,373,950 B2
(45) Date of Patent: Jun. 21, 2016

(54) MODULAR MULTILEVEL CONVERTER VALVE PROTECTION METHOD

(75) Inventors: Yang Gao, Beijing (CN); Yuefeng Yang, Beijing (CN); Renqiu Wang, Beijing (CN); Zhiyuan He, Beijing (CN); Xinggang Zhang, Beijing (CN); Minhua Xie, Beijing (CN)

(73) Assignees: GLOBAL ENERGY INTERCONNECTION RESEARCH INSTITUTE, Beijing (CN); STATE GRID CORPORATION OF CHINA, Beijing (CN); CHINA-EPRI ELECTRIC POWER ENGINEERING CO., LTD, Beijing (CN); CHINA ELECTRIC POWER RESEARCH INSTITUTE, Beijing (CN)

( * ) Notice: Subject to any disclaimer, the term of this patent is extended or adjusted under 35 U.S.C. 154(b) by 76 days.

(21) Appl. No.: 14/005,267

(22) PCT Filed: Nov. 29, 2011

(86) PCT No.: PCT/CN2011/083115
§ 371 (c)(1),
(2), (4) Date: Sep. 15, 2013

(87) PCT Pub. No.: WO2012/122825
PCT Pub. Date: Sep. 20, 2012

(65) Prior Publication Data
US 2014/0002933 A1 Jan. 2, 2014

(30) Foreign Application Priority Data
Mar. 16, 2011 (CN) .......................... 2011 1 0063130

(51) Int. Cl.
| | | |
|---|---|---|
| *H02H 7/00* | (2006.01) |
| *H02H 3/08* | (2006.01) |
| *H02M 1/32* | (2007.01) |
| *H02M 7/483* | (2007.01) |

(52) U.S. Cl.
CPC ................ *H02H 3/085* (2013.01); *H02M 1/32* (2013.01); *H02M 2001/325* (2013.01); *H02M 2007/4835* (2013.01)

(58) Field of Classification Search
CPC ....................................................... H02M 1/32
USPC ............................................................ 361/18
See application file for complete search history.

(56) References Cited

U.S. PATENT DOCUMENTS

| | | | | |
|---|---|---|---|---|
| 5,608,595 | A * | 3/1997 | Gourab et al. ................... | 361/79 |
| 8,884,465 | B2 * | 11/2014 | Sarhan ..................... | H02M 1/32 307/77 |
| 2005/0111246 | A1 * | 5/2005 | Lai et al. ........................ | 363/157 |
| 2008/0084642 | A1 * | 4/2008 | Kato et al. ........................ | 361/56 |
| 2014/0313797 | A1 * | 10/2014 | Davidson et al. ............... | 363/50 |

\* cited by examiner

*Primary Examiner* — Thienvu Tran
*Assistant Examiner* — Tien Mai
(74) *Attorney, Agent, or Firm* — Platinum Intellectual Property LLP

(57) ABSTRACT

The invention relates to Modular multilevel converter valve protection method, the modular multilevel converter valve consists of 6 arms, the arm includes sub modules, 1 arm is controlled by 1 control host, 6 control hosts is controlled by 1 summary control host, the method of the invention includes that the arm realizes locking sub module, bypass sub module, trip requests and system switching request and the summary control host implements summary and control response. The invention improves the reliability of two protection system through the use of dual redundancy protection method, clears the protection division through the layered protection frame of the upper summary control host and multi arm control host. And finally, it improves the whole safety and reliability of the modular multilevel converter valve.

3 Claims, 2 Drawing Sheets

MODULAR MULTILEVEL CONVERTER VALVE PROTECTION METHOD

RELATED APPLICATIONS

This application is a United States National Stage Application filed under 35 U.S.C. 371 of PCT Patent Application Serial No. PCT/CN2011/083115, filed Nov. 29, 2011, which claims the benefit of Chinese Patent Application Serial No. 201110063130.6, filed on Mar. 16, 2011, the disclosure of all of which are hereby incorporated by reference in their entirety.

FIELD OF THE INVENTION

The invention relates to power electric direct current transmission of power system filed, in particular, relates to Modular multilevel converter valve protection method.

BACKGROUND OF THE INVENTION

Modular multilevel converter based HVDC transmission is a new generation of multilevel voltage source converter HVDC topology. Several sub modules and specific modulation are applied in a sine waveform of arm voltage. Due to the discrepancy of three-phase arm voltage, circulating current appears among the three-phase unit. The circulating current distorts the sine arm current and increases its peak value, so the requirements of current rating increase.

First the sub module consists of turn-off devices, and then the sub modules are connected in series to form a modular multilevel converter. Modular multilevel converter valve is the core and key equipment of flexible DC transmission; ft is not only the requirements for the system but also the requirements for protection itself to guarantee the converter valve safe and stable operation.

SUMMARY OF THE INVENTION

Figure 1:
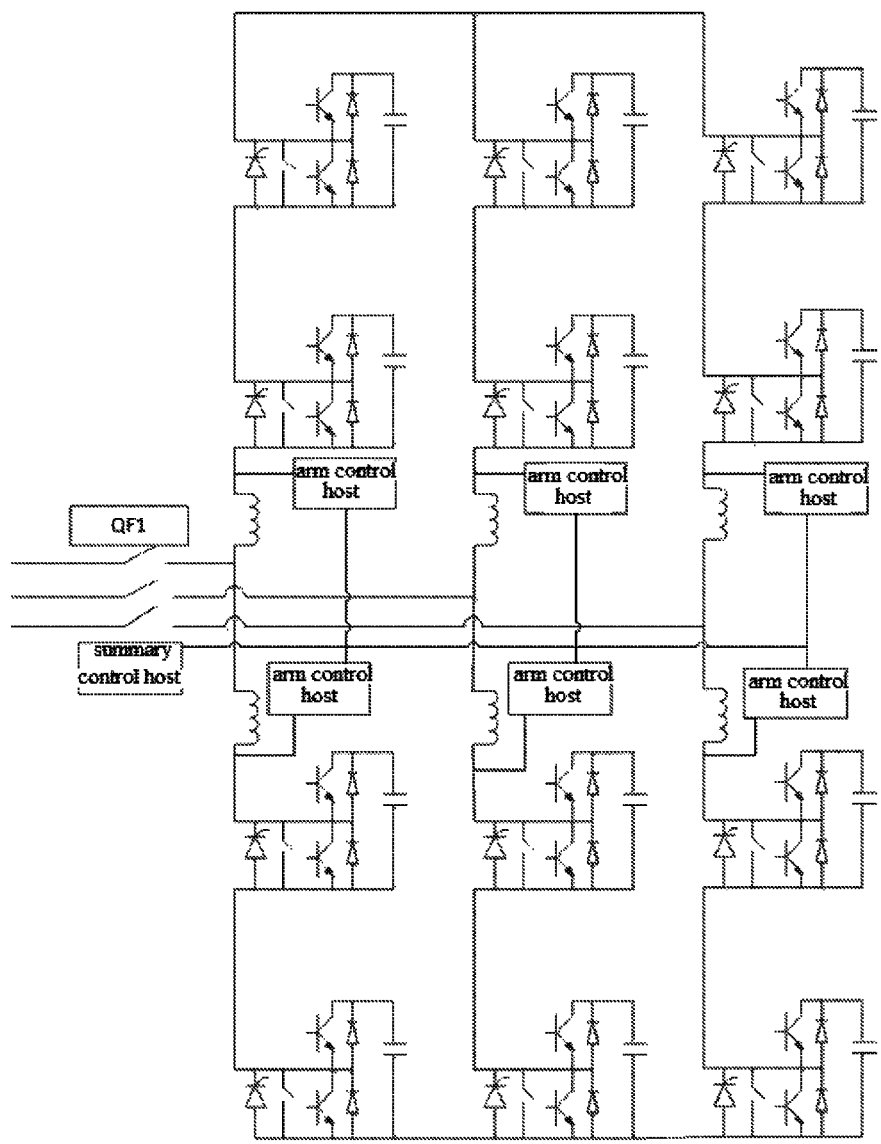
FIG. 1 is the schematic diagram of the converter provided by the invention.

In view of the defects of the prior art, the technical problem of the invention need to solve is to design Modular multilevel converter valve protection method, ensure the reliable operation of the modular multilevel converter valve.

Modular multilevel converter valve protection method provided by the invention, said modular multilevel converter valve consists of 6 arms, said arms consists of sub modules, its improvement is that, said method includes following steps:

1) Connecting said arms with one end of arm control host, another end of said arm control host is connected with the summary control host;

2) When IGBT or drive temporary faults of sub modules occur, said arm control host will turn off the IGBT of sub modules;

When information receiving fault of sub module, the overvoltage fault of sub module, undervoltage fault of sub module, frequent check fault of sub module receiving the information, IGBT frequent fault or drive frequent fault occur, said arm control host will close the bypass switch of sub modules;

When sub module bypass switch refuses to trip, or the bypass number of sub module is too much, said arm control host will send trip request to the summary control host;

When the time of the arm control host receiving the upper information is out, said arm control host will send system switch request to the summary control host;

When the arm current is over large, said arm control host will send trip request with the thyristor trigger to the summary control host;

3) After step 2), if the fault still exists, said arm control host will close the bypass switch of sub modules, summary and send fault signals to the summary control host;

4) The summary control host judges the arms trip request, the trip request with the thyristor trigger and system switch request according to arm control host feedback and arm current, and then carries out arms trip, the trip with the thyristor trigger and system switch;

First technical protection method of modular multilevel converter valve provided by the invention is preferred: its improvement is that, said temporary fault in said step 2) is referred that the faults will not occur 2 times continually.

Second technical protection method of modular multilevel converter valve provided by the invention is preferred: its improvement is that, said the time of the arm control host receiving the upper information is out in said step 2) is referred that it cannot receive the feedback 2 times continually.

Third technical protection method of modular multilevel converter valve provided by the invention is preferred: its improvement is that, said arm current is over large in said step 2) is referred that the current is more than set maximum arm current.

Fourth technical protection method of modular multilevel converter valve provided by the invention is preferred: its improvement is that, said bypass number of sub module is too much in said step 2) is referred that it is more than set redundancy.

Fifth technical protection method of modular multilevel converter valve provided by the invention is preferred: its improvement is that, said information receiving fault of sub module in said step 2) is referred that sub modules cannot receive signals.

Sixth technical protection method of modular multilevel converter valve provided by the invention is preferred: its improvement is that, said the trip request with the thyristor trigger in said step 2) is referred that requesting to trip breaker of the converter and open the thyristor of each sub module at the same time.

Seventh technical protection method of modular multilevel converter valve provided by the invention is preferred: its improvement is that, said arm trip in said step 2) is referred to open the breaker of the converter.

Eighth technical protection method of modular multilevel converter valve provided by the invention is preferred: its improvement is that, said the arm control hosts and the summary control host are all valve base control device; said valve base control device includes a power supply, an interface board and a central processing unit; the power supply, the interface board and the central processing unit are connected with the fiber through a backplane.

Compared with the prior art, the present invention has the following advantages:

The hierarchical control and protection method provided by the invention, is characterized that, clear scope of protection for of the converter valve, clear division of labor, dear responsibility, simple and reliable design.

The protection method provided by the invention that is based on arm control host and upper summary control host can guarantee the reliable operation of the modular multilevel converter valve to a large extent, and smallest the effect of few individual failure to the entire valve running.

The invention improves the reliability of two protection system through the use of dual redundancy protection method, dears the protection division through the layered protection frame of the upper summary control host and multi arm control host; the arm control host judges the fault type by the fault information from sub module returns to complete the valve arm protection; it summaries and carries out overall protection by upper summary control host to improve the whole safety and reliability of the modular multilevel converter valve.

DETAILED DESCRIPTION OF EMBODIMENTS

The detail of the embodiments is described as below incorporated with the figures by way of cross-reference for the present invention.

In order to avoid primary devices out of work due to the fault or out of control of the secondary devices, the scheme proposed two sets of spinning reverse control and protection systems at the same time, that is, it consists of two sets of arm control hosts and a summary control host, and they are the two sets of control and protection systems A and B, respectively. One is primary protection system and another is secondary system. They do not affect each other, and complete independently failure judge for the system. The two systems have some level and status; one can select one as the main system randomly or manually once starting up.

Taking one set of embodiments to describe further as below.

Figure 2:
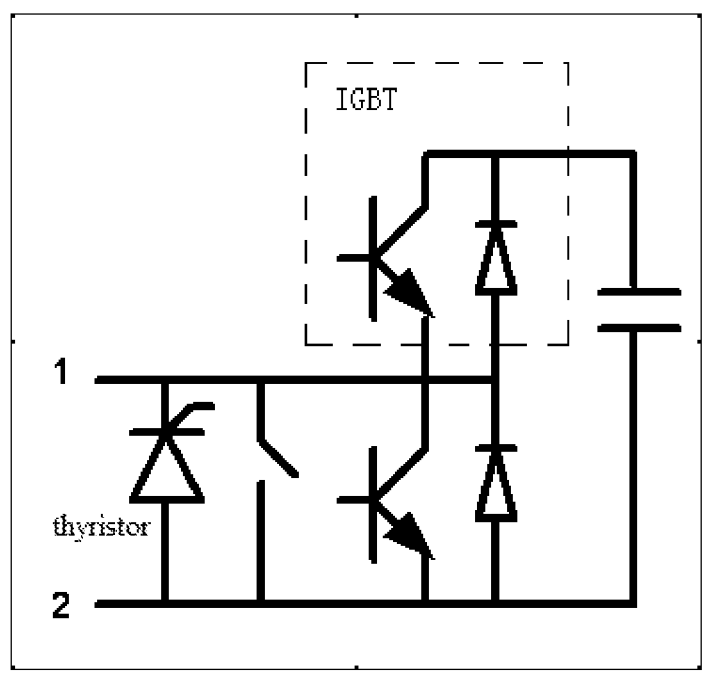
FIG. 2 is the schematic diagram of the sub module proposed by the invention.

As shown in FIG. 1, QF1 is the circuit breaker, connecting the grid voltage and current converter, the converter needs to connect the grid by connecting the reactor (the symbol that is similar to the inductor in FIG. 1). Modular multilevel converter valve consists of 6 arms, each arm can be considered as a unit, each arm consists of sub modules which are connected in series, the number of sub module of the arm varies according to the project needs, in the figure some sub modules is omitted using dashed lines. An individual control host complete the fault detection and protection of sub module of each arm, the upper layer of 6 arms control host is a summary control host which summaries 6 arms failure and the whole valve protection. As shown in FIG. 2, the sub module includes 2 IGBTs containing anti parallel diodes, 1 thyristor and 1 bypass switch. The control host is called valve base control device. Valve base control device includes a power supply, an interface board and a central processing unit. The power supply, the interface board and the central processing unit are connected with the fiber through a backplane. The interface board is responsible for the connection sub modules.

Each arm has a control host to protect the arm independently, each control host make judgments according to the fault type, and the judgment results are divided into the following four categories: the first category is locking sub modules, that is the upper and lower IGBTs of the sub modules are all turned off; the second is bypassing sub modules, that is closing down the bypass switch of sub modules so that it does not affect the converter; the third category is trip request, that is calling for tripping the incoming line breaker of the converter; the fourth is the system switching request, that is adopting redundant control and protection system. The following is specific judgment:

The first category faults consist of the following faults: IGBT or drive temporary faults of sub modules; the second category faults include the following faults: information receiving fault of sub module, the overvoltage fault of sub module, undervoltage fault of sub module, frequent check fault of sub module receiving the information, IGBT frequent fault or drive frequent fault; the third category faults include the following: sub module bypass switch does not trip, the bypass number of sub module is too much; the fourth category faults include the following faults: the time of the arm control host receiving the upper information is out.

For the IGBT or drive temporary faults of sub modules, the sub modules takes the protection method of turning off sub modules, the modules are still a part of the converter, they are still useful until this failure occurs 2 times continually. For the modules whose fault was determined and not available or whose state cannot be accurately determined, bypassing sub modules protection method is taken, and the sub module bypassed will not affect the converter, the converter can continue to work without influence. For the situations of that sub module bypass switch refuse to trip or the bypass number of sub module is more than set redundancy, the calling for trip request protection method will be taken because the remaining sub modules number cannot meet the minimum requirements of the converter already. Once the trip request is accepted, all controllable sub modules of arms will be under blocking state that is two IGBTs will be under blocking state. If the devices of the current control and protection system occurs fault, the method that sends system switching request will be taken.

The upper summary control host communicates with each arm control host to acquire each arm fault condition, and treat converter valve global fault according to that condition. In addition, the controller of the upper summary control host to carry out over-current protection of the arm by detecting the feedback current value of arm current sensor. The host controller divides the fault diagnosis results into the following three categories according to the arm control host feedback and the arm current: the first category is ordinary trip request that is calling for tripping incoming line breaker of the converter. This includes the following specific fault: arm control host has trip request. The second category is the trip request with the thyristor trigger that is calling for tripping incoming line breaker of the converter and opening the thyristor of sub modules at the same time. This includes the following specific fault: arm current is too large. The third is the system switching request. This includes the following specific faults: arm control host switching request, communication timeout when receiving upper layer information.

The upper summary control host uploads the ordinary trip request of arm control host. In addition, once arm current is over, the upper summary control host will send trip request and sub module thyristor trigger command at the same time to ensure the diode is not damaged under the locking case. if the devices of the current control and protection system occurs fault, the method that sends system switching request, so that the system is switched to the system without fault.

At last, in this description of the embodiments, we have detail describe the present invention according to a particular example. The detail embodiment is one example of the invention but not the only one, so the person in this field must be understand that all the alternatives and other equal and/or similar examples are all within the range of the invention and they are all consistent with the spirits of this invention, are all protected by our claims.

What is claimed is:

1. A modular multilevel converter valve including six arms, the six arms including a plurality of sub modules, the modular multilevel converter comprising:
a summary control host and the six arms, each of the six arms configured to connect to a respective arm control host at a first end; wherein the modular multilevel convert is configured to:
determine that a sub module is associated with a fault using the arm control host,
disenable the sub module using the arm control host associated with the sub module;
receive information related to at least one of the fault of the sub module, an over-voltage of the sub module, a under-voltage of the sub module, or a frequent-check of the sub module; and
disenable a bypass switch associated with the sub module, using the arm control host associated with the at least one of the sub module.

2. The modular multilevel converter valve of claim 1, wherein the respective arm control host and the summary control host are valve base control devices, each of the valve base control devices includes a power supply, an interface board and a central processing unit.

3. The modular multilevel converter valve of claim 1, wherein the fault is associated with one of the following categories including an IGBT fault or a temporary-drive fault, or an over-voltage or an under-voltage of a sub module.

* * * * *